US005947671A

United States Patent [19]

Kanaan et al.

[11] Patent Number: 5,947,671

[45] Date of Patent: Sep. 7, 1999

[54] HAND ACTUABLE CLAMPING DEVICE WITH CIRCUMFERENTIALLY EXTENDING TIGHTENING MEMBERS

[75] Inventors: Roger J. Kanaan, Dayton, Ohio; Stephen E. Gibson, Salem; Dennis D. Claramunt, Anderson, both of S.C.

[73] Assignee: Power Tool Holders Incorporated, Wilmington, Del.

[21] Appl. No.: 09/016,102

[22] Filed: Jan. 30, 1998

[51] Int. Cl.$^6$ ...................................................... F16B 37/16

[52] U.S. Cl. .......................... 411/435; 411/408; 411/409; 74/553; 74/554; 74/555; 74/557

[58] Field of Search .................................... 411/432, 408, 411/409, 435; 16/DIG. 41, 121; 242/395, 395.1; 74/555, 556, 557, 553, 554

[56] References Cited

U.S. PATENT DOCUMENTS

| | | | |
|---|---|---|---|
| 1,048,261 | 12/1912 | Zerk | 411/435 |
| 2,049,104 | 7/1936 | Charlton | 411/435 |
| 3,395,601 | 8/1968 | Miller | 411/435 |
| 4,955,744 | 9/1990 | Barth | 411/408 |
| 4,976,071 | 12/1990 | Stäbler . | |
| 5,388,877 | 2/1995 | Wenk | 242/395.1 |
| 5,494,368 | 2/1996 | Matthews . | |
| 5,567,100 | 10/1996 | Nakamura . | |
| 5,577,872 | 11/1996 | Nakamura . | |

FOREIGN PATENT DOCUMENTS

| | | | |
|---|---|---|---|
| 3884 | 3/1897 | United Kingdom | 411/435 |

*Primary Examiner*—Flemming Saether
*Attorney, Agent, or Firm*—Dority & Manning

[57] ABSTRACT

A clamping mechanism is configured for receipt on a threaded drive spindle to hold a working tool relative to the drive spindle. The mechanism includes a flange surface disposed to abut against a working tool in an operational mode of the device, and a rotatable member configured with the flange surface and disposed to advance the flange surface upon manual rotation thereof. The rotatable member includes at least one manual tightening device or mechanism for effectively increasing the manual tightening torque.

14 Claims, 2 Drawing Sheets

HAND ACTUABLE CLAMPING DEVICE WITH CIRCUMFERENTIALLY EXTENDING TIGHTENING MEMBERS

BACKGROUND OF THE INVENTION

The present invention relates to clamping or securing devices in general, and more particularly to a mechanism configured to hold a working tool or device, such as a grinding wheel, to a rotatable drive spindle. In particular, the invention relates to a hand actuable clamping device having a feature to more effectively hand tighten the mechanism.

Hand tightened clamping devices are well known in the art. For example, U.S. Pat. Nos. 5,567,100 and 5,577,872 describe various embodiments of such tightening or clamping devices. These patents describe a tightening screw or clamping device having a torque enhancing feature. The device includes an operating ring that is hand actuated in order to screw the device onto a threaded spindle. U.S. Pat. No. 4,976,071 to Stäbler describes a clamping device for portable grinding machines having a clamping nut that is screwed onto a threaded drive spindle to clamp a grinding disk in place. The device includes a clamping fork which is pivoted between a clamping position and a loosened position. The clamping fork is not used to manually rotate the device, but applies an axially directed pressing force when moved from its loosened position to the clamping position.

U.S. Pat. No. 5,494,368 to Matthews describes a clamping device or fastener that is also threaded onto a drive spindle. The fastener includes a gripping device for manual tightening or loosening. This gripping device is described as a single planar member pivotally connected to the fastener. The planar member is pivoted to an upright position wherein it can be manually grasped to apply a torque to the fastener.

The present invention provides alternative improved means for enhancing the hand tightening or loosening operations of conventional clamping or fastening nuts.

OBJECTS AND SUMMARY OF THE INVENTION

It is therefore a principal object of the present invention to provide an improved clamping or fastening device.

Another object of the present invention is to provide a clamping or fastening device with enhanced hand tightening or loosening features.

Additional objects and advantages of the invention will be set forth in part in the following description, or may be obvious from the description, or may be learned through practice of the invention.

In accordance with the objects and purposes of the invention, an improved clamping mechanism is provided. The clamping mechanism is configured for receipt on a threaded drive spindle for holding a work tool relative to the drive spindle, for example for securing a grinding wheel or disk to the drive spindle of a grinder, as is commonly known in the art. However, it should be appreciated that the environment or application of use for the present inventive clamping device is not particularly important to the invention. The clamping device according to the present invention can be used in any number of applications or environments wherein it is desired to hold a working tool to a drive spindle. The inventive clamping device also has application outside of the power tool industry wherever a manually operated tightening or loosening device is used.

In one particular embodiment according to the invention, the clamping mechanism includes a flange member that defines a flange surface disposed to abut against a working tool in an operational mode of the device. This flange surface applies a clamping pressure to the tool. A rotatable member is configured with the flange surface and is disposed to advance the flange surface upon rotation thereof. The rotatable member is typically hand actuated and is manually threaded onto a drive spindle. As the member is threadedly advanced along the spindle, the flange surface advances towards the working tool and eventually applies a pressing or holding force to the tool surface. In one preferred embodiment of the invention, a tightening lever is disposed on the rotatable member. This lever is movable from a stored position to an extended position wherein the lever extends circumferentially outward beyond the rotatable member. In this manner, the circumferentially extending lever provides an increased effective tightening diameter for the rotatable member thereby providing for enhanced tightening or loosening of the rotatable member. When extended, the tightening lever defines a circumferentially extended gripping element or surface for the operator. Thus, the moment arm applied to the rotatable device is significantly increased.

In one preferred embodiment, the rotatable member defines a front face and the circumferentially extending lever is mounted on the front face. The front face may comprise a storage recess for the lever in its stored position. Preferably, a pivot point is defined on the front face for the lever. The pivot point is disposed radially outward from a rotational axis through the mechanism. The lever may extend generally tangentially from this pivot point relative to the rotational axis of the mechanism. In an alternative embodiment, the lever could also extend radially from the pivot point. However, in this embodiment, the length of the lever would be limited by the radial length of the front face between its threaded bore and the circumferential edge thereof.

In an alternative preferred embodiment, the rotatable member defines a circumferential sidewall. In this embodiment, the lever may be mounted on the side wall which further includes a storage recess for the lever in its stored position. In this embodiment, a pivot point may be defined for the lever on the side wall. The pivot point is disposed radially outward from a rotational axis through the mechanism. In this embodiment, when the levers are in their extended position, they extend essentially radially outward from a rotational axis of the mechanism. Alternatively, the levers may extend radially and tangentially in their extended position.

Preferably, the levers are locked in position once they are placed in their circumferentially extended positions so that the levers can be used to both tighten and loosen the mechanism.

The present invention has particular usefulness in conventional clamping devices having a manually actuated operating ring or member, for example as described in U.S. Pat. Nos. 5,567,100 and 5,577,872. However, it should be appreciated that the inventive clamping mechanism is not limited to this sort of device. For example, the present invention has the same usefulness in a clamping device wherein the flange member is rotatably driven by the operating ring or rotatable member, or even formed integral with the rotatable member.

In an alternative preferred embodiment of the invention, at least two longitudinally extending tightening members are disposed on the rotatable member. The tightening members are generally equally circumferentially spaced and extend in a longitudinal direction from the rotatable member that is generally parallel to a rotational axis through the mechanism. Each of the tightening members is individually mounted on the rotatable member and is configured to individually transmit a "pushing" torque to the mechanism in the same rotational direction from an external force applied to the tightening members. In other words, each member pushes a surface of the clamping device in the same direction.

In this embodiment, the tightening members may comprise levers that are pivotally mounted on the rotatable member and individually movable from a stored position to an operating position wherein the levers extend longitudinally from the rotatable member. Since the levers are individually mounted and each lever is disposed to transmit a pushing tightening or loosening torque in the same direction, the levers fold towards the front face in the same circumferential direction in their stored position. Preferably, a storage recess is defined in the rotatable member for the levers. Preferably, the levers are locked in their longitudinally extended position so that they may be used to both tighten and loosen the mechanism.

In still a further alternative preferred embodiment of the invention, at least two longitudinally extending tightening recesses are defined on the rotatable member. The tightening recesses are generally equally circumferentially spaced on the rotatable member and extend in a longitudinal direction generally parallel to a rotational axis of the mechanism. Each tightening recess defines a pushing surface configured to individually transmit a pushing tightening or loosening torque to the mechanism from an external force applied to the tightening recess. For example, with this embodiment, an operator can "push" the rotatable member in a tightening or loosening direction by pushing against the surfaces defined by the recesses.

In a preferred embodiment, the recesses are defined between longitudinally extending ribs defined on the rotatable member. The pushing surfaces may be defined as curved surfaces extending between adjacent ribs. Since the curves are generally symmetrical, the same force and principle are utilized in pushing the device in both a tightening and loosening direction.

In yet another preferred embodiment of the invention, the rotatable member configured with the flange surface includes a gripping surface defined thereon. In this embodiment, means are provided for longitudinally extending the gripping surface from a stored position for tightening the mechanism. In certain applications of the clamping device, there may be limited room directly adjacent to the clamping nut for an operator to tighten the device. In such an application, it may be preferred that the device were longitudinally extendable so that the operator could more easily tighten the device. In this embodiment, the rotatable member comprises a front face and a circumferential side wall which defines the gripping surface. The means for longitudinally extending the gripping surface includes a ring member rotationally coupled to the front face and longitudinally movable relative thereto from a stored position to an extended position in a direction away from the flange face. Preferably, interengaging rotational drive members or dogs are defined between the ring member in the front face. The drive members or dogs allow the ring member to be moved longitudinally yet rotationally couple the ring member to the front face member. Preferably, the ring member is biased towards its stored position.

DETAILED DESCRIPTION OF THE PREFERRED EMBODIMENTS

Figure 1:
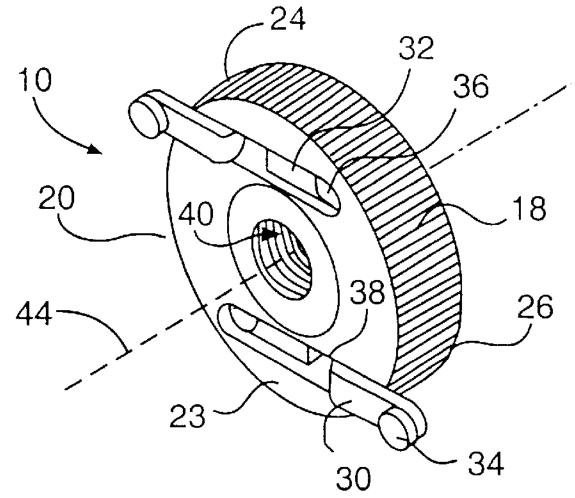
FIG. 1 is a perspective view of one preferred embodiment of the clamping device according to the invention.

Reference will now be made in detail to the presently preferred embodiments of the invention, one or more examples of which are illustrated in the drawings. Each example is provided to explain the present invention, and is not meant as a limitation of the invention. For example, features illustrated or described as part of one embodiment can be used on another embodiment to yield still a third embodiment. It is intended that the present description include such modifications and variations as come within the scope and spirit of the invention.

The present invention relates to a clamping or fastening device wherein a substantial portion of the torque required to operate the device in either the loosening or tightening direction is transmitted by hand. The invention has particular usefulness in applications wherein rotary tools, for example grinding wheels, circular saw blades, carving disks, and the like, are held to a power tool. However, it should be appreciated, that the invention has much wider applications.

In well known applications of conventional clamping or fastening devices, a tool, such as a grinding wheel, is held to a threaded spindle of a tool. When the clamping device is screwed onto the spindle, it applies a pressure to the tool which is then clamped against a backing plate and thus secured to the spindle. With certain clamping devices, a spanner or similar tool may be required to tighten the device securely. Alternatively, certain clamping devices have torque enhancing features, such as the devices described in the U.S. patents cited above. Additionally, the clamping devices also have the tendency to tighten during use due to the direction of rotation of the drive spindle and it can be difficult to subsequently loosen the device.

It should be appreciated that the present invention is applicable in any application or environment wherein a clamping or fastening nut, or equivalent mechanism, is manually tightened or loosened on a drive spindle.

FIG. 1 illustrates a clamping device, generally 10, in a commonly understood configuration wherein device 10 is threaded onto a threaded portion 13 of a drive spindle 12. A working tool, for example a grinding disk, 22 is clampingly held between a shoulder 28 and a flange surface 18 of flange member 16. The working tool is rotationally driven about a rotational axis 44. The clamping device 10 includes an internally threaded bore, generally 40, with internal threads 15 that threaded engage with threads 14 on portion 13 of spindle 12. Clamping device 10 further includes a rotatable member 20 that is manually grasped by an operator to threadedly advance the device on the spindle. Rotatable member 20 may include a front face portion 23 and side walls 24. The clamping device 10 illustrated in FIG. 1 has internal working mechanisms that provide a torque enhancing feature to the device as illustrated and described in U.S. Pat. No. 5,577,872. However, for purposes of the present description, the internal workings of device 10 are not important and need not be described in detail herein. The present invention relates to particular configurations of the rotatable member which is manually grasped and rotated to operate the device.

Figure 2:
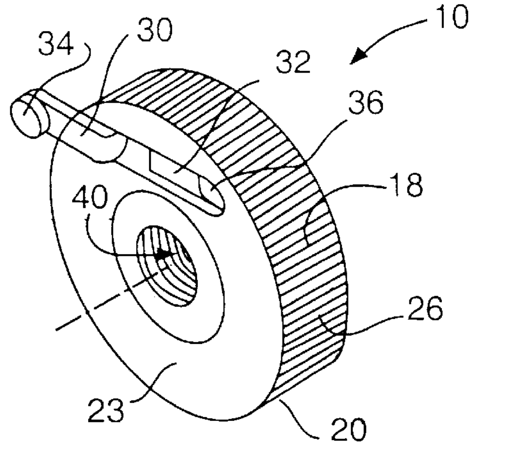
FIG. 2 is a perspective view of an alternative embodiment of the invention.
Figure 1A:
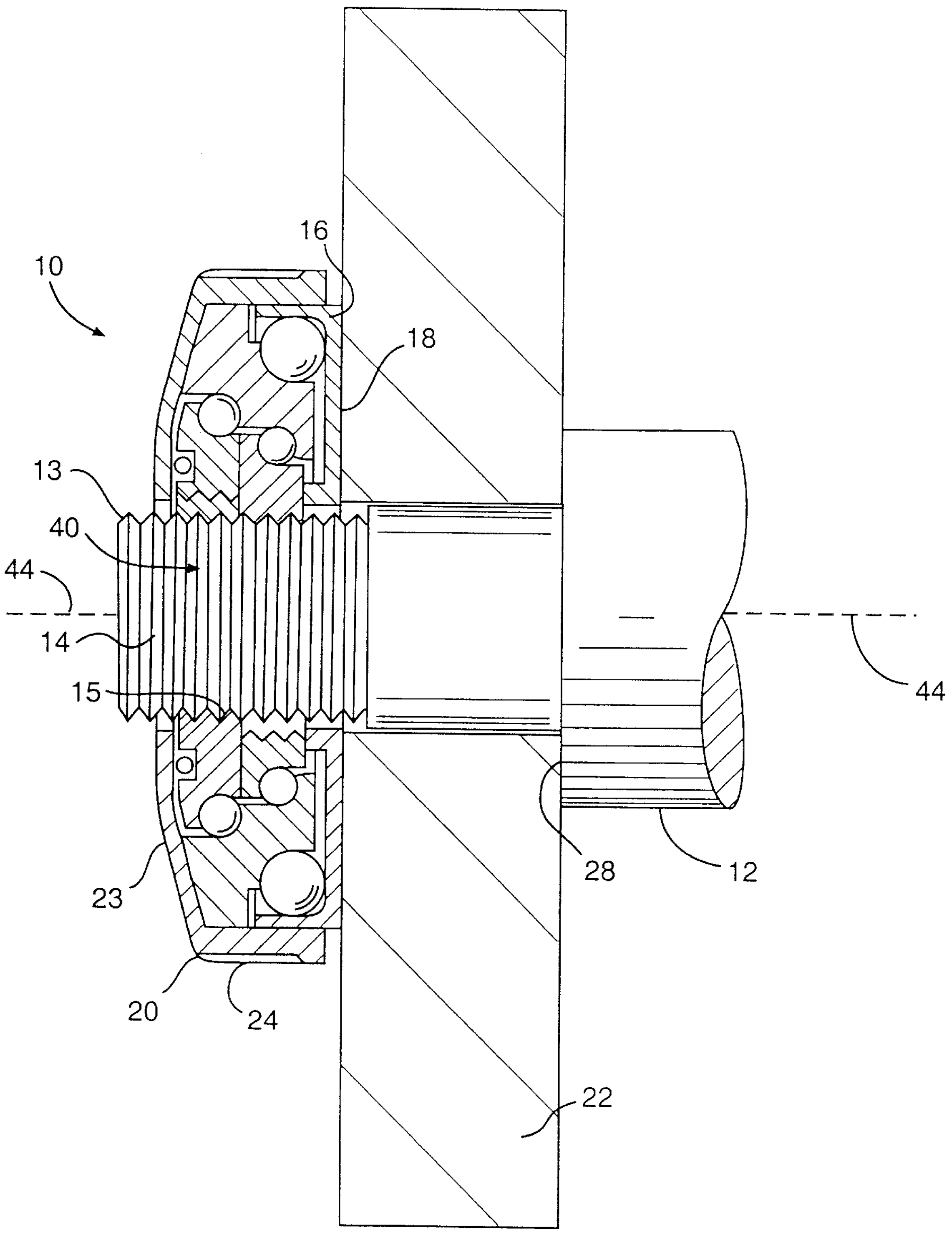
FIG. 1*a* is a cross-sectional view of a conventional clamping device as illustrated in U.S. Pat. No. 5,577,872.

FIGS. 1 and 2 illustrate particular preferred embodiments of the invention. Clamping device 10 includes a flange surface 18 disposed to abut against a working tool in an operational mode of the device, as illustrated in FIG. 1*a*. Flange surface 18 may be defined on a separate flange member 16, as illustrated in FIG. 1*a*, or may be formed integral or coupled with rotatable member 20, for example in embodiments wherein the flange member and rotatable member are rotationally coupled.

At least one tightening lever 30 is disposed on rotatable member 20. The lever 30 is movable from a stored position to an extended position as illustrated in FIGS. 1 and 2. In the extended position, levers 30 extend circumferentially outward beyond the outer circumference of rotatable member 20 thereby effectively defining an increased tightening or loosening diameter or moment arm for rotatable member 20. Thus, an operator can manually grasp either or both of levers 30 to apply an effectively increased manual tightening or loosening torque to the device.

Preferably, a recess 32 is defined in the rotatable member 20, for example on the front face 23 thereof. Recesses 32 house levers 30 in their stored position. A knob or handle device 34 may also be installed on the levers 30. Knob or handle 34 may be separately rotatable relative to lever 30 to assist in rotation of the device. A knob recess 36 is also defined in handle recess 32 to house knob 34 in the stored position of lever 30.

Each lever 30 comprises a pivot point which is located radially outward from the rotational axis 44 of device 10. In the embodiment illustrated, levers 30 extend generally tangentially from pivot points 38 relative to rotational axis 44. This embodiment may be preferred in that it allows for a greater length of lever 30. In an alternative embodiment of the invention not illustrated, levers 30 may extend purely radially with respect to rotational axis 44. However, in this embodiment, the length of levers 30 would be limited by the radial length of rotatable member 20 between bore 40 and the outer circumference thereof.

The pivot mechanism for levers 30 is not particularly illustrated in the figures since any manner of conventional pivot hinges or devices are applicable and are well understood by those skilled in the art. Any and all such conventional devices can be used in the present invention.

The embodiment illustrated in FIG. 1 includes two levers 30 as described above. The pivot points for levers 30 are generally radially opposite from each other and the levers 30 extend in opposite tangential directions from each other. In the embodiment of FIG. 2, one such lever 30 is configured with rotatable member 20.

The embodiments illustrated in FIGS. 1 and 2 are particularly useful in that they allow for enhanced tightening and loosening of the device.

It also preferred that levers 30 securely engage within their respective recesses 32 by any conventional manner. For example, a friction fit may be provided between either or both of knobs 34 and/or levers 30 with their respective recesses 32, 36. Alternatively, a positive mechanical locking device may be provided. Such mechanical locking devices are well known by those skilled in the art and need not be described in detail herein. It is merely preferred that the levers 30 be securely maintained in their stored position during operation of device 10.

Figure 3:
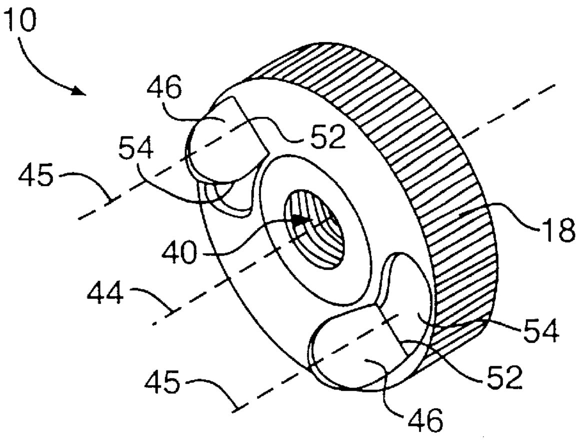
FIG. 3 is a perspective view of an alternative embodiment of the invention particularly illustrating the longitudinally extending flaps or levers.

An alternative preferred embodiment of the invention is illustrated in FIG. 3. In this embodiment, at least two longitudinally extending tightening members 46 are generally equally circumferentially spaced on rotatable member 20 and extend in a longitudinal direction 45 that is generally parallel to rotational axis 44. Each tightening member 46 is individually mounted on rotatable member 20 along a pivot or hinge line 52. Each member 46 is pivotally mounted so that upon application of a manual tightening force thereto, each member 46 individually transmits a pushing tightening torque to the mechanism. In this manner, it should be understood that the pivot or hinge line 52 is constructed so that when members 46 are in their longitudinally extended position as illustrated in FIG. 3, the members 46 abut against a planar surface of rotatable member 20 to individually transmit the tightening torque. Any manner of hinge mechanisms can be used in this regard. For example, one such hinge mechanism is described in U.S. Pat. No. 5,494,368 to Matthews.

Since the individual extending members 46 are configured to individually transmit the same type of tightening or loosening force, they are folded into rotatable member 20 in the same circumferential direction, as generally illustrated by recesses 54 in FIG. 3. As described above with regards to FIGS. 1 and 2, any conventional locking mechanism or device can be utilized to ensure that levers 46 remain securely housed in recesses 54 during operation of device 10.

Device 10 illustrated in FIG. 3 is particularly useful for rotating in either a tightening or loosening direction depending on the orientation of tightening members 46. For example, as illustrated in FIG. 3, levers 46 would be utilized to transmit a clockwise rotation. However, it should be appreciated, that the hinge lines 52 could be constructed so that members 46 can be used to transmit the same type of "pushing" torque in either the loosening or tightening direction. It is well within the level of those skilled in the art to construct such a pivot or hinge line. For example, although not illustrated in the drawings, a groove or recess having substantially planar sides could be defined in recesses 54 generally along hinge lines 52, wherein members 46 "drop" into these recesses in their extended positions. The planar side walls of the recesses would provide torque transmitting surfaces in either direction.

Figure 4:
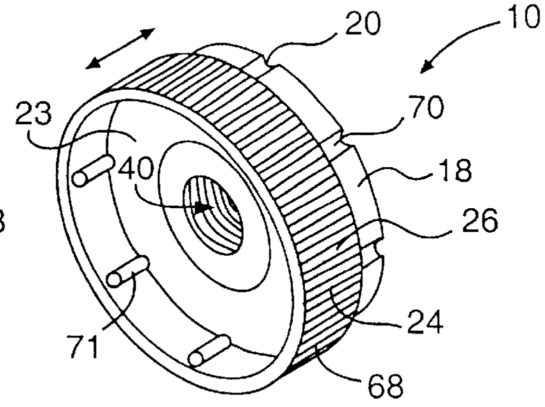
FIG. 4 is a perspective view of an alternative embodiment of the invention particularly illustrating the longitudinally extended ring member.

A further preferred embodiment of the invention is illustrated in FIG. 4. Device 10 according to FIG. 4 is particularly useful wherein, for whatever reason, there is limited space directly adjacent to the working tool for an operator to manually grasp and rotate device 10. In such applications, it may be preferred to have a means for longitudinally extending the gripping surface. Referring to FIG. 4, the rotatable member includes a ring member 68 defining side walls 24. Ring member 68 is longitudinally movable relative to the remaining portion of ring member 20 and front face 23. In other words, ring member 68 can be longitudinally pulled away from front face 23. Ring member 68 is rotationally coupled to ring member 20 and front face 23 by any manner of engaging drive dogs, splines, or the like, generally illustrated as spline 70, 71. Ring 68 is biased by means of a spring or like device (not illustrated) towards its stored position. Preferably, ring 68 may also include ridges 26 defined on side wall 24 to assist the operator in gripping the ring member.

The means for longitudinally extending a gripping surface of device 10 may also include the longitudinally extending levers 46 illustrated in the device according to FIG. 3.

Figure 5:
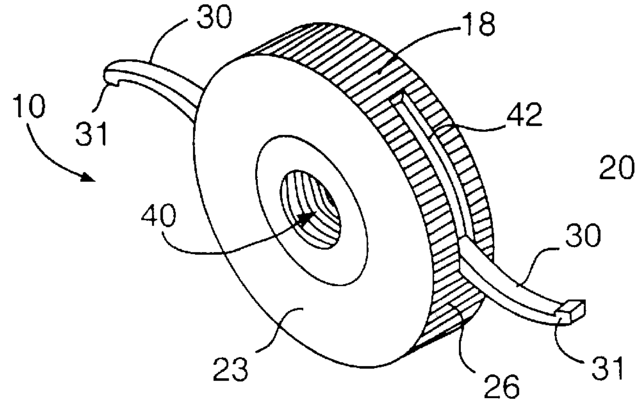
FIG. 5 is a perspective view of a preferred embodiment of the invention particularly illustrating the circumferentially extending levers.

FIG. 5 illustrates an alternative preferred embodiment of the invention similar to that illustrated in FIGS. 1 and 2. However, in the embodiment of FIG. 5, levers 30 are pivotally mounted to extend circumferentially from a side wall 24 of rotatable member 20. Members 30 are housed in their stored position within recesses 42 defined in side wall 24. Knobs or tabs 31 are provided on the ends of levers 30 which may serve for additional gripping surfaces and also to positively lock levers 30 within recesses 42. In this embodiment, levers 30 have a curvature substantially the same as the circumference of rotatable member 20 and extend generally radially outward. However, it should be understood, that levers 30 may also include a tangential component. By mounting levers 30 on side wall 24, the effective length of levers 30 can be increased beyond that of the levers illustrated in FIGS. 1 and 2. Any number of levers 30 could be mounted, with the length of the levers limiting the number of levers.

Figure 6:
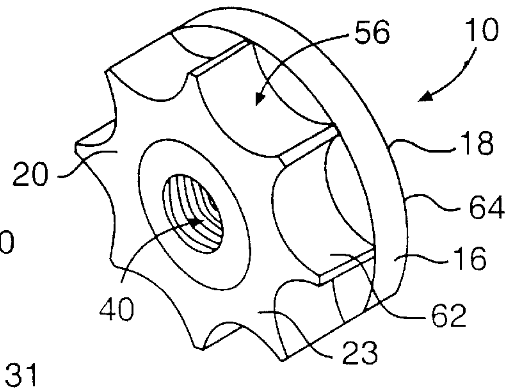
FIG. 6 is a perspective view a preferred embodiment of the invention particularly illustrating longitudinally extending recesses.

In the embodiment illustrated in FIG. 6, at least two longitudinal extending tightening recess 56 are defined on rotatable member 20. In the embodiment illustrated, recesses 56 are defined generally on the circumference of rotatable member 20 and are disposed between ribs 60. Recesses 56 are defined by curved surfaces 62. Curved surfaces 62 essentially define a pushing surface wherein an operator can manually apply a pushing force along the radial component of curved surfaces 62. Since surfaces 62 are symmetric in either direction, the pushing force can be used to tighten or loosen device 10. In the embodiment illustrated, ribs 60 extend radially to generally a circumferential surface 64 of either rotatable member 20 or flange member 16. Curved surfaces 62 are curved radially inward between ribs 60. It should be appreciated, however, that an increased tightening force could be provided by increasing the diameter of rotatable member 20 so that recesses 56 extend radially beyond circumferential surface 64.

The particular configuration of recesses 56 illustrated in FIG. 6 is merely one suitable configuration. It should be appreciated that any manner of longitudinal recesses could be configured to define a pushing surface wherein an operator can manually apply a tightening torque directly to the pushing surface for rotating device 10 in either direction. Any and all such configurations are within the scope and spirit of the invention.

It should be appreciated by those skilled in the art that various modifications and variations can be made in the invention without departing from the scope and spirit of the invention. It is intended that the present description encompass such modifications and variations as come within the scope of the appended claims and their equivalents.

What is claimed is:

1. A clamping mechanism configured for receipt on a threaded drive spindle for holding a working tool relative to the drive spindle, said mechanism comprising:

a flange surface disposable against a working tool in an operational mode of said device;

a rotatable member configured with said flange surface such that rotation of said rotatable member will advance said flange surface on a threaded spindle; and at least one tightening lever disposed on said rotatable member, said lever movable from a stored position to an extended position wherein in said extended position said lever extends circumferentially outward beyond said rotatable member and provides an increased effective diameter for said rotatable member thereby providing for enhanced tightening or loosening of said mechanism and wherein in said stored position said lever is offset from a rotational axis of said rotatable member through which a threaded spindle extends; and wherein said rotatable member comprises a storage recess for said lever in said stored position.

2. The mechanism as in claim 1, wherein said rotatable member defines a front face, said lever mounted on said front face, and said storage recess for said lever in said stored position defined in said front face.

3. The mechanism as in claim 2, further comprising a pivot point for said lever defined on said front face, said pivot point disposed radially outward from a rotational axis of said mechanism.

4. The mechanism as in claim 1, wherein said rotatable member defines a circumferential side wall, said lever mounted on said side wall, said side wall comprising said storage recess for said lever in said stored position.

5. The mechanism as in claim 4, further comprising a pivot point for said lever defined on said side wall, said pivot point disposed radially outward from a rotational axis of said mechanism.

6. The mechanism as in claim 5, wherein in said extended position said lever extends essentially radially outward from a rotational axis of said mechanism.

7. The mechanism as in claim 5, wherein in said extended position said lever extends radially and tangentially outward from a rotational axis of said mechanism.

8. The mechanism as in claim 7, further comprising two said levers wherein said respective pivot points are radially opposite on said side wall and said levers extend in opposite directions from said side wall.

9. The mechanism as in claim 1, wherein said flange surface and said rotatable member are rotationally independent.

10. A clamping mechanism configured for threaded engagement with a complimentary threaded member for holding a working object relative thereto, said mechanism comprising:

a flange surface disposed to abut against said working object in an operational mode of said device;

a rotatable member configured with said flange surface and having a threaded center bore to longitudinally advance said flange surface upon rotation thereof on a threaded member, said rotatable member further comprising a gripping surface; and means for circumferentially extending said gripping surface to provide an increased effective diameter thereto for increasing a tightening force applied to said mechanism, said means disposed so as not to block access of the threaded member through said threaded center bore; and wherein said means are movable into a recess defined in said rotatable member in a non-extended position thereof.

11. The mechanism as in claim 10, wherein said rotatable member defines a front face and a circumferentially extending side wall, said means for circumferentially extending comprises a tightening lever disposed on at least one of said front face or said side wall, said lever movable from a stored position to an extended position wherein in said extended position said lever extends circumferentially outward beyond said front face and provides an increased effective gripping diameter for said respective front face or side wall.

12. A hand actuable clamping device configured for threaded engagement with a complimenting threaded member for holding an object relative thereto, said clamping device comprising:

a flange surface disposed to abut against said object in an operational mode;

a manually rotatable member with a threaded central bore configured with said flange surface to threadedly advance said clamping device upon rotation thereof on a threaded member extending through said central bore;

at least one tightening lever disposed on said rotatable member, said lever movable from a stored position offset from said central bore to an extended position relative to said rotatable member wherein said lever extends circumferentially outward beyond said rotatable member and provides an increased effective gripping diameter and enhanced manual tightening or loosening of said device; and wherein said tightening lever is movable into a storage recess defined in said rotatable member.

13. A clamping mechanism configured for receipt on a threaded drive spindle for holding a working tool relative to the drive spindle, said mechanism comprising:

a flange surface disposed to abut against a working tool in an operational mode of said device;

a rotatable member configured with said flange surface and disposed to advance said flange surface upon rotation thereof;

at least one tightening lever disposed on said rotatable member, said lever movable from a stored position to an extended position wherein in said extended position said lever extends circumferentially outward beyond said rotatable member and provides an increased effective diameter for said rotatable member thereby providing for enhanced tightening or loosening of said mechanism;

said rotatable member defining a front face, said lever mounted on said front face, and said front face comprising a storage recess for said lever in said stored position;

a pivot point for said lever defined on said front face, said pivot point disposed radially outward from a rotational axis of said mechanism; and wherein said lever extends generally tangentially from said pivot point relative to said rotational axis of said mechanism.

14. A clamping mechanism configured for receipt on a threaded drive spindle for holding a working tool relative to the drive spindle, said mechanism comprising:

a flange surface disposed to abut against a working tool in an operational mode of said device;

a rotatable member configured with said flange surface and disposed to advance said flange surface upon rotation thereof;

at least two tightening levers disposed on said rotatable member, said lever movable from a stored position to an extended position wherein in said extended position said lever extends circumferentially outward beyond said rotatable member and provides an increased effective diameter for said rotatable member thereby providing for enhanced tightening or loosening of said mechanism;

said rotatable member defining a front face, said levers mounted on said front face, and said front face comprising storage recesses for said levers in said stored position;

a pivot point for said levers defined on said front face, said pivot points disposed radially outward from a rotational axis of said mechanism; and wherein said respective lever pivot points are radially opposite and said levers extend generally tangentially from said pivot points relative to said rotational axis of said mechanism in opposite directions from said front face.

* * * * *